United States Patent [19]

Matre et al.

[11] Patent Number: 4,826,191
[45] Date of Patent: May 2, 1989

[54] BICYCLE OR TRICYCLE

[75] Inventors: Daniel A. Matre, Milwaukee; Jeffrey L. Bleustein, Bayside, both of Wis.

[73] Assignee: Harley-Davidson, Inc., Milwaukee, Wis.

[21] Appl. No.: 60,734

[22] Filed: Jun. 10, 1987

[51] Int. Cl.$^4$ ............................................. B62M 1/02
[52] U.S. Cl. ...................................... 280/261; 74/68; 474/88
[58] Field of Search ............... 280/259, 260, 261, 262, 280/281 R, 281 LP, 210, 7.15; 474/88, 89; 74/68, 69, 63

[56] References Cited

U.S. PATENT DOCUMENTS

| | | | |
|---|---|---|---|
| 387,979 | 8/1888 | Latta | 280/261 |
| 393,837 | 12/1888 | Kibbe | 280/262 |
| 401,295 | 4/1889 | Norton | 280/261 |
| 426,855 | 4/1890 | Reed | 280/261 |
| 536,647 | 4/1895 | Nichols | 474/89 |
| 579,970 | 4/1897 | Fenton | 280/261 |
| 672,438 | 4/1901 | Black | 280/261 |
| 789,580 | 5/1905 | Trainor | 474/89 |
| 984,953 | 2/1911 | Matthews | 474/58 |
| 1,360,032 | 11/1920 | Schiffner | 474/88 |
| 1,535,714 | 4/1925 | Burke | 474/89 |
| 1,559,276 | 10/1925 | Nelson | 280/261 |
| 2,248,313 | 7/1941 | Stevens | 280/261 |
| 2,602,677 | 7/1952 | Connolly | 280/261 |
| 3,614,130 | 10/1971 | Forse | 280/261 |

FOREIGN PATENT DOCUMENTS 20982 of 1892 United Kingdom.

Primary Examiner—Charles A. Marmor
Assistant Examiner—Everett G. Diederiks, Jr.
Attorney, Agent, or Firm—Fred Wiviott

[57] ABSTRACT

A velocipede such as a bicycle or tricycle includes a drive sprocket mounted on a frame for adjustment between a plurality of positions defining an arcuate path having an axis of curvature. A second sprocket is rotatably mounted on the axis and is coupled to the drive sprocket by a first chain. A third sprocket is mounted coaxially with and is coupled to the second sprocket for rotation therewith. A fourth sprocket is mounted on the rear wheel and coupled to the third sprocket by a second drive chain.

2 Claims, 3 Drawing Sheets

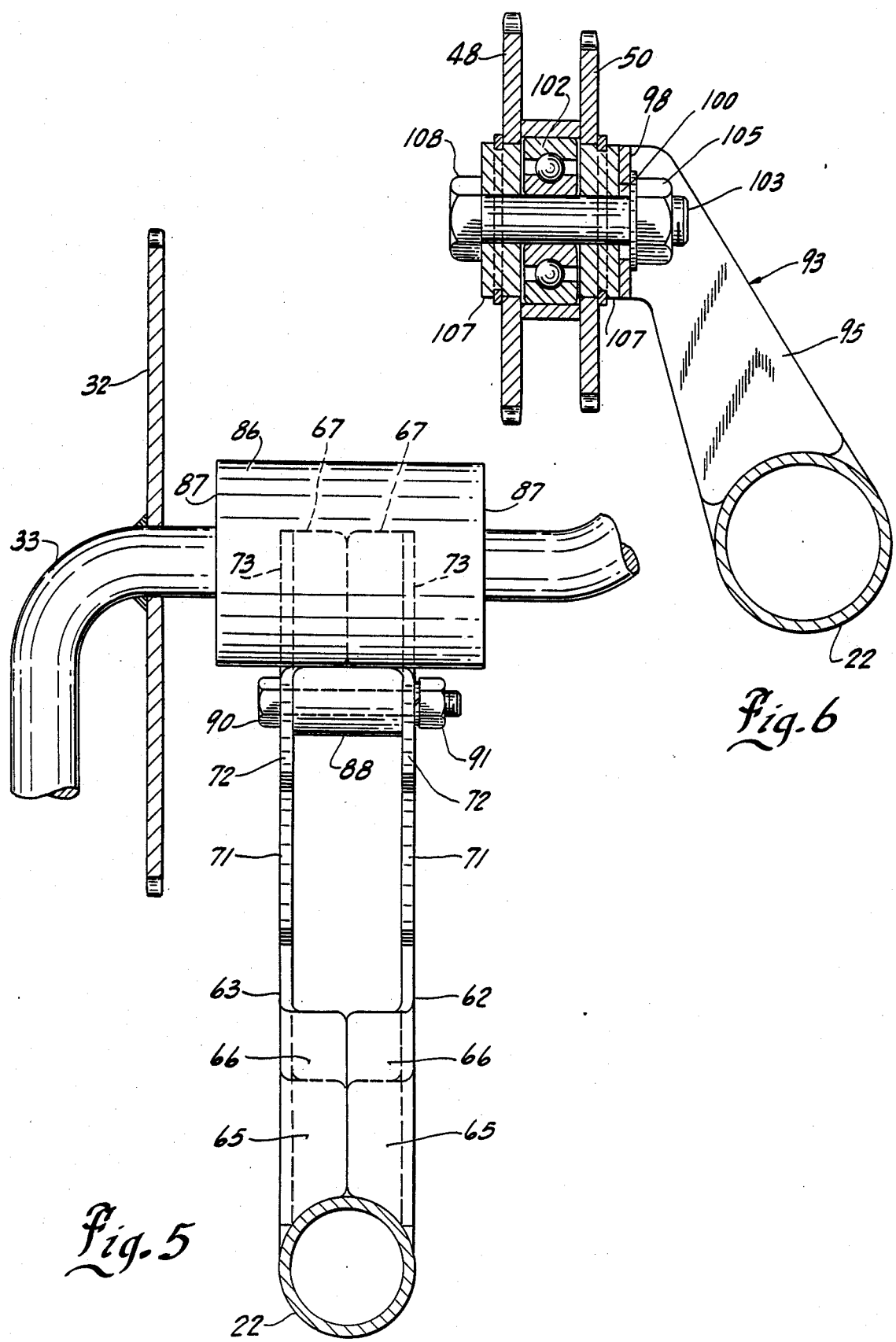

BICYCLE OR TRICYCLE

BACKGROUND OF THE INVENTION

This invention relates to velocipedes and more particularly to bicycles or tricycles in which the position of the pedals can be adjusted relative to a fixed seat location.

The most common method of adjusting the distance between a bicycle seat and the pedals is to mount the seat for vertical adjustment while the bicycle drive sprocket is mounted for rotation about a fixed axis relative to the bicycle frame. Another method, such as that shown in U.S. Pat. No. 2,602,777, permits the drive sprocket to be adjusted about the axis of the rear wheel. The latter has the disadvantage of also moving the entire drive chain vertically when the sprocket is being adjusted. There is therefore a need to provide a bicycle or tricycle in which the position of the pedals can be changed relative to the seat without changing the tension in the drive chain.

SUMMARY OF THE INVENTION

It is an object of the invention to provide a new and improved bicycle or tricycle.

Another object of the invention was to provide a new and improved bicycle or tricycle in which the distance between the seat and the drive pedals can be adjusted without moving either the seat or the drive chain coupled to the rear wheel.

A further object of the invention was to provide a bicycle or tricycle in which there is greater flexibility for variations in force and speed multiplication.

Yet another object of the invention is to provide a bicycle or tricycle in which the position of the pedals can be changed relative to the seat without changing the tension in the drive chain.

These and other objects and advantages of the invention will become more apparent from the detailed description of the preferred embodiment of the invention.

In general terms the invention comprises a bicycle or tricycle having a frame, a drive sprocket mounted on the frame and constructed and arranged to be fixed to said frame in a plurality of positions defining an arcuate path having an axis of curvature, a second sprocket mounted on the frame for rotation about the axis of curvature, a first drive chain coupling the first and second sprockets, a third sprocket mounted on the frame co-axially relative to the second sprocket and coupled thereto for rotation therewith, a fourth sprocket mounted on the rear bicycle wheel, and a second drive chain coupling said third and fourth sprockets.

BRIEF DESCRIPTION OF THE DRAWINGS

FIG. 5 is a view taken along lines 5—5 of FIG. 4;

FIG. 6 is a view taken along lines 6—6 of FIG. 4.

DETAILED DESCRIPTION OF THE PREFERRED EMBODIMENT

Figure 1:
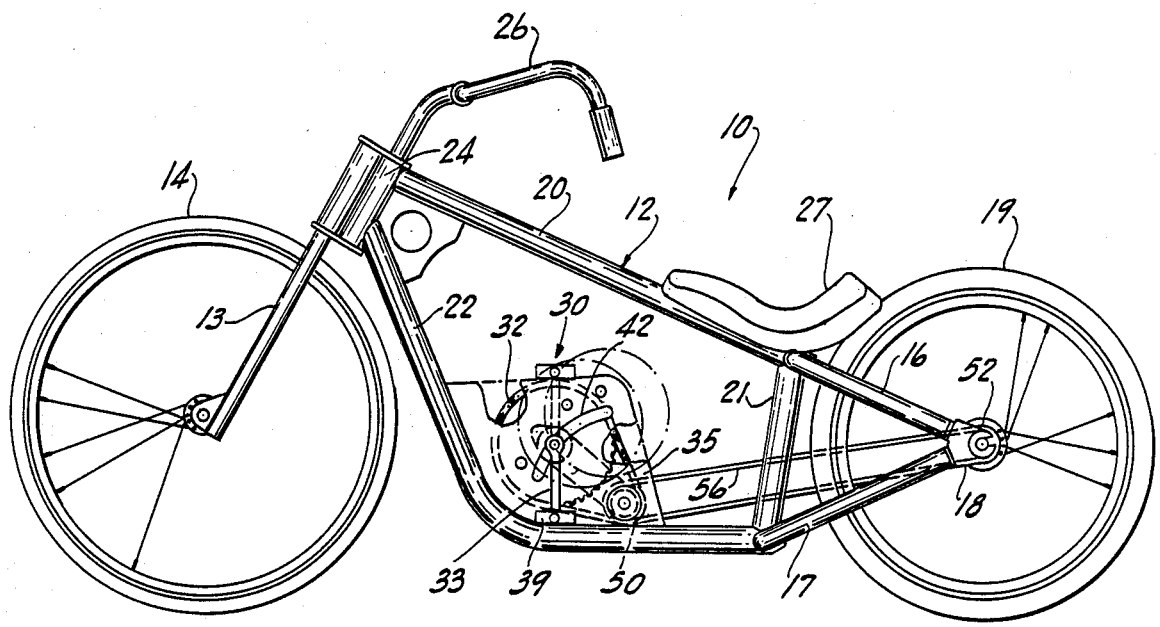
FIG. 1 is a side elevational view showing a bicycle according to one embodiment of the invention.

The bicycle 10 shown in FIG. 1 includes a frame 12 composed of tubular sections and having a front fork 13 for rotatably supporting a front wheel 14 and rear struts 16 and 17 which support axel plates 18 for rotatably mounting a rear wheel 19. The wheels 14 and 19 may be the same size, or the front wheel may be larger, as shown.

The frame 12 also includes an upper bar 20 fixed at its front end adjacent the upper end of the fork 13 and at its other end to the upper end of a vertically extending post 21. In addition, the frame has a down tube 22 fixed at its front end to a steering head 24 and extends downwardly and rearwardly therefrom where its opposite end is coupled to the lower end of the post 21. Handle bars 26 are conventionally mounted in the steering head 24 and a seat 25 is mounted at the upper end of the post 21.

The bicycle 10 also includes a drive 30 consisting of a primary drive sprocket 32 mounted on a crank 33 which is received in a bearing 34. The primary drive sprocket 32 is mounted for arcuate movement on the frame 12 by means of an arm 36 pivotally mounted at one end about a shaft 38 extending between bearings 39 secured to the frame part 22. In particular, the bearing 34 is secured adjacent the other end of the arm 36 for movement therewith. A pair of pedals 39 are rotatably mounted on the ends of the crank 33.

Mounted on the frame part 22 adjacent the arm 36 is a plate 41 having an arcuate slot 42 for receiving the shaft 33 therethrough. The center of curvature of the slot 42 is coincident with the axis of shaft 38. Plate 41 also has a plurality of holes 44 formed therein in an arcuate array and equidistant from the axis of shaft 38. There is also an opening 45 in the end of arm 36 which is the same distance from the axis of shaft 38 as the holes 42. The arm 36 may thus be pivoted through an angle defined by the arc 42 and fixed in a plurality of angular positions by a bolt 46 which extends through the opening 45 in arm 36 and one of the openings 44 in plate 41. In this manner, the distance between the pedals 39 and the seat 27 may be adjusted without elevating the seat 27.

The drive 30 also includes a pair of sprockets 48 and 50 mounted on shaft 38. In addition, there is a fourth sprocket 52 mounted on the axle 53 of the rear wheel 19. A first endless chain or belt 55 extends around the sprockets 32 and 48 and a second endless chain or belt 56 extends around the sprockets 50 and 52. It can be seen that while the first chain or belt 55 will pivot with the sprocket 32 and arm 36, the second belt or chain will remain stationary. It will also be appreciated that the rotational speed of the rear wheel relative to that of the pedals 39 can be modified by replacing the sprocket 48 with one having a different size. It will be appreciated that adjustment of the sprocket and crank 33 can be made without affecting the tension on either of the chains 55 or 56.

Figure 4:
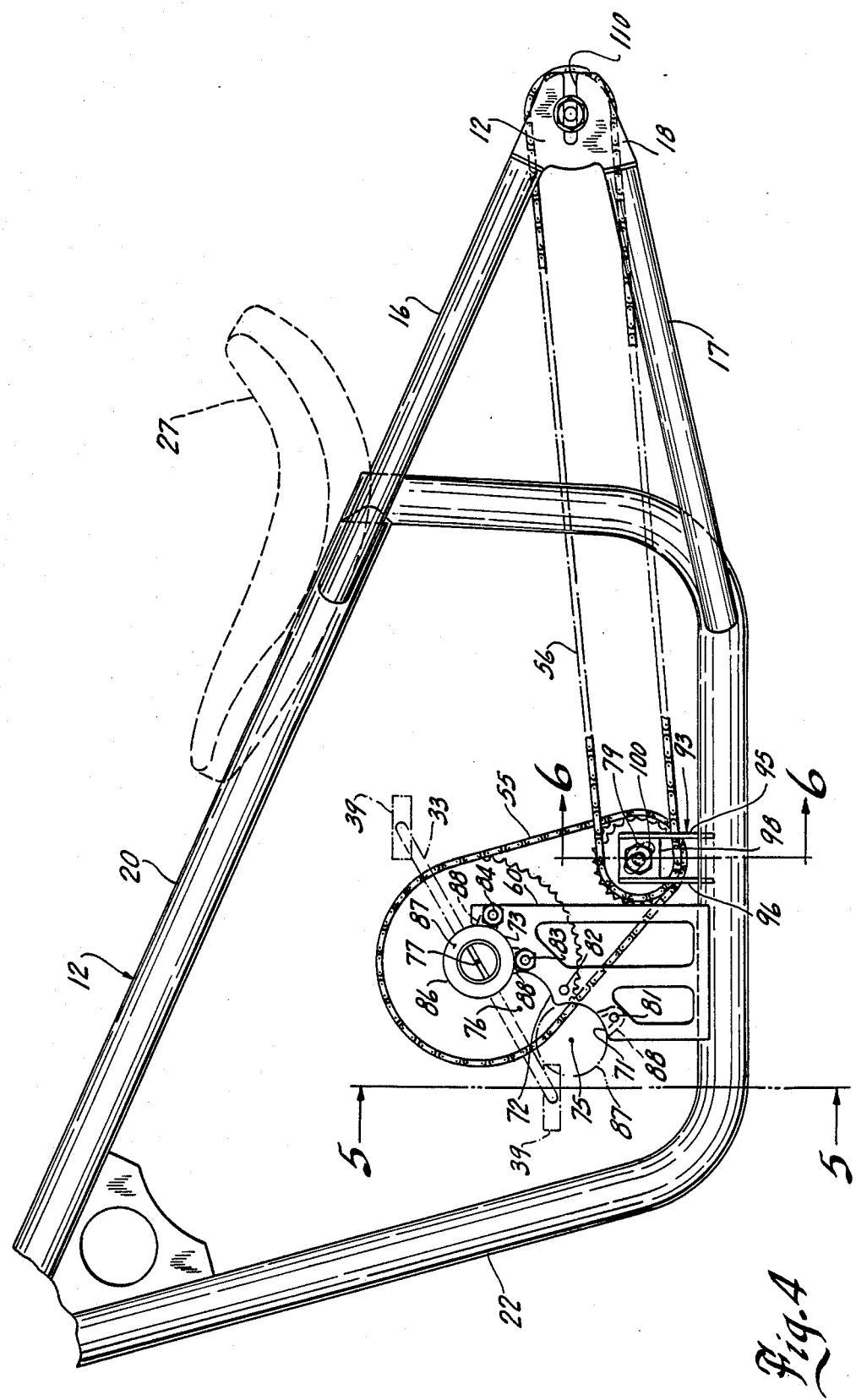
FIG. 4 is a side elevational view of the preferred embodiment of the invention.

The preferred embodiment of the invention is shown in FIGS. 4, 5 and 6. Here the primary drive sprocket 32 may be positioned in alternate positions relative to the seat 27 on a primary bracket 60. In particular, the primary bracket 60 comprises a pair of side plates 62 and 63 which are fixed at their lower edges to the horizontal section of the down tube 22 and extend upwardly therefrom. The plates 62 and 63 are maintained in a parallel, spaced apart relation by means of wings 65, 66 and 67 which extend inwardly from plate 62 and engage and are suitably secured to complementary wings 65', 66' and 67' extending inwardly from plate 63. The plates 62 and 63 have generally vertical side edges and a generally upper surface edge 69 which has three arcuate support recesses 71, 72 and 73. Each of the support recesses 71, 72 and 73 is a circular section having centers of curvature 75, 76 and 77, respectively, which are equidistant from an axis 79. There are also four holes 81, 82, 83 and 84 formed in each plate 62 and 63 and spaced apart adjacent their upper edges, such that there are a pair of holes adjacent the opposite ends of each support recess 71, 72 and 73.

While only plate 62 can be seen in FIG. 4, it will be appreciated that plate 63 is a mirror image of plate 62 and is oriented so that its support recesses 71, 72 and 73 and its holes 81, 82, 83 and 84 are in alignment with corresponding portions of the plate 62.

The arcuate recesses 71, 72 and 73 are proportioned such that they are each complementary with the cylindrical outer surface of the housing 86 for the crank bearing 87. In addition, there are a pair of channel members 88 fixed to the surface of housing 86 and extending in the axial direction. The distance between the axes of the channel members 88 is such that when the housing 86 is nestled on arcuate recesses of the plates 62 and 63, such as the edges 71 as shown in FIG. 4, the channel members 88 are each in alignment with coaxial openings 81 and 82, respectively, in each of the plates. This permits the bearing 87 to be releasably secured to the primary bracket 60 by means of bolts 90 and nuts 91.

The secondary sprockets 48 and 50 are mounted on a second bracket 93 which is fixed to the tube 22 rearwardly of the primary bracket 60 and includes a pair of parallel spaced apart side portions 95 and 96 which are connected at their upper ends by a perpendicularly extending web 98. As seen in FIG. 4, the web 98 has a diagonal slot 100 having the axis 79 at its center. The slot 100 is oriented such that an extension of its longitudinal axis intersects the center of curvature 76 of the support recesses 72.

Referring now to FIG. 6, the secondary sprockets 48 and 50 are shown to be fixed to a bearing 102 which rotates on a pin 103 extending through the slot 100. A nut 105 is received on the threaded end of pin 103 for securing the secondary sprockets and the bearing 102 to the bracket 93. A pair of wheel hubs 107 are disposed between the sprockets 48 and 50 and the head 108 of pin 93 on one side and the web plate 98 on the other.

Figure 2:
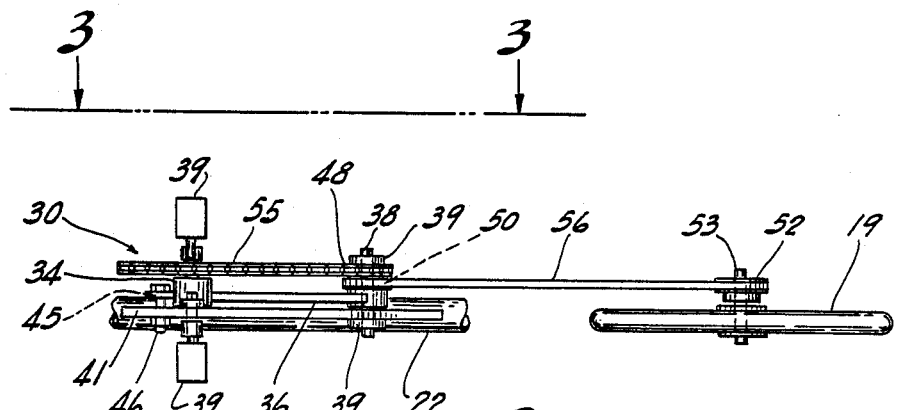
FIG. 2 is a top plan view of the drive portion of the bicycle shown in FIG. 1.
Figure 3:
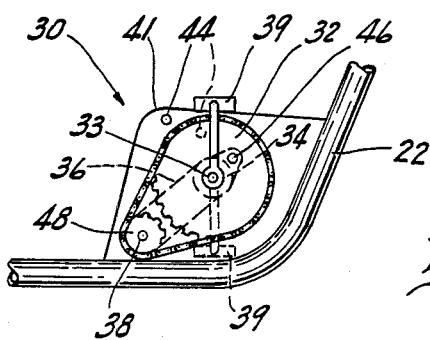
FIG. 3 is a view taken along lines 3—3 of FIG. 2.

As in the embodiment of FIGS. 1-3, a first chain or belt extends around the primary drive sprocket 32 and the secondary sprocket 48. A second belt or chain 56 extends from the sprocket 52 mounted on the rear wheel axle.

When it is desired to move the main drive sprocket 32 from one position to another, each of the nuts 91 are removed and the bolts 90 withdrawn from the channels 88. In addition, the nut 105 is loosened to permit the pin 103 to be moved in slot 100. Depending upon the amount of slack in the chain 56, it may also be necessary to loosen the nuts holding the rear wheel 19 in the slot 110 in the rear axel plates 18. The bearing 87 may then be moved from the support recess 71, for example, as shown by broken lines of FIG. 4 to the support recess 73 as shown by full lines. The bolts 90 are then reinserted through holes 83 and 84 in sleeves 88 and the nuts 91 are then secured. The pin 107 is then centered in slot 100 and the nut 105 is tightened. Finally, if the rear wheel nuts have been loosened, they are again retightened. In this manner, the primary drive sprocket 32 and the crank 18 can be moved relative to the seat 27.

While only a single embodiment of the invention has been illustrated and described, it is not intended to be limited thereby but only by the scope of the appended claims. For example, while the invention is illustrated with respect to a bicycle, it is also applicable to tricycles as well.

We claim:

1. A bicycle or tricycle including the frame, at least a pair of wheels rotatably mounted on the frame, a seat mounted on the frame, a crank, a first sprocket mounted on said crank, bearing means for rotatably supporting said crank, housing means surrounding said bearing means and having an outer surface, support means mounted on the frame and generally between the wheels, said support means including a bracket mounted on said frame and for supporting said housing, a second sprocket mounted on the frame for rotation about a first axis, a third sprocket coaxial with the second sprocket and coupled thereto for rotation therewith, a fourth sprocket mounted on one of the bicycle wheels for rotating the same when said fourth sprocket is rotated, a first endless means coupled with said first and second sprockets and second endless means coupling said third and fourth sprockets so that the one of the wheels of the bicycle will be turning when the first sprocket is rotated, said bracket including a pair of spaced apart members extending in a side by side relation from said frame, each member having an edge formed on the side thereof remote form the first axis, said members lying in planes which intersect the first axis, a plurality of arcuate shaped surfaces formed on corresponding portions of the edges of each of said members, corresponding ones of said surfaces on said members defining spaced apart support surfaces for said housing, said surfaces each being complementary to the outer surface of the housing for engaging said outer surface to support said housing, corresponding portions of each surface lying in an arc whose center of curvature lies at the first axis, each of said pair of corresponding arcuate surfaces on the bracket members defining a support position for the housing, means engagable with said housing said bracket for releasably securing the housing in each of said positions, the rotational axis of said fourth sprocket being a substantially greater distance from the first axis than the rotational axis of the first sprocket so that movement of the first sprocket between said positions will result in limited movement of the first endless means while the second endless means remain stationary, and a second bracket mounted on said frame, said second and third sprockets being mounted on said second bracket, and second bracket including a slot extending toward said arcuate surfaces, pin means extending through said slot for rotatably supporting said second and third sprocket means, and means for releasably securing said pin means in said slot.

2. A bicycle or tricycle including the frame, at least a pair of wheels rotatably mounted on the frame, a seat mounted on the frame, a crank, a first sprocket mounted on said crank, bearing means for rotatably supporting said crank, housing means surrounding said bearing means, support means mounted on the frame and generally between the wheels for supporting said bearing means, a second sprocket mounted on the frame for rotation about a first axis, a third sprocket coaxial with the second sprocket and coupled thereto for rotation therewith, a fourth sprocket mounted on one of the bicycle wheels for rotating the same when said fourth sprocket is rotated, a first endless means coupled with said first and second sprockets and second endless means coupling said third and fourth sprockets so that the one of the wheels of the bicycle will be turned when the first sprocket is rotated, said support means including a bracket mounted on said frame and on the opposite side of the first axis from the fourth sprocket, said bracket including a member extending from said frame, said member lying in a plane which intersects the axis, an arm pivotally mounted on said frame and about said first axis and adjacent said bracket, a plurality of openings formed in said member, the axes of said openings defining an arc whose center of curvature lies at the first axis, releasable locking means engagable with said housing and the openings in said bracket for retaining the housing in each of a plurality of positions relative to the seat, the rotational axis of said fourth sprocket being a substantially greater distance from the axis of curvature than the rotational axis of the first sprocket so that movement of the first sprocket will result in limited movement of the first endless means while the second endless means remain stationary.

* * * * *